(12) United States Patent
Hopton et al.

(10) Patent No.: US 7,175,903 B1
(45) Date of Patent: Feb. 13, 2007

(54) HEAT SEALABLE POLYVINYL CHLORIDE FILMS

(75) Inventors: Thomas E. Hopton, Stow, OH (US); Carl M. Sullivan, Copley, OH (US); Paul N. Georgelos, Naperville, IL (US)

(73) Assignee: Pliant Corporation, Schaumburg, IL (US)

( * ) Notice: Subject to any disclaimer, the term of this patent is extended or adjusted under 35 U.S.C. 154(b) by 335 days.

(21) Appl. No.: 10/429,054

(22) Filed: May 2, 2003

Related U.S. Application Data

(63) Continuation-in-part of application No. 09/715,874, filed on Nov. 17, 2000.

(51) Int. Cl.
*B32B 27/34* (2006.01)
*B32B 1/08* (2006.01)

(52) U.S. Cl. .................... 428/212; 428/35.2; 428/35.7; 428/36.6; 428/36.91; 428/220

(58) Field of Classification Search ................ 428/212, 428/220, 137, 515, 520, 910, 35.2, 35.7, 428/36.6, 36.91
See application file for complete search history.

(56) References Cited

U.S. PATENT DOCUMENTS

| | | | |
|---|---|---|---|
| 3,943,103 A | 3/1976 | Borden et al. | |
| 3,949,135 A | 4/1976 | Vercauteren | |
| 3,988,500 A | 10/1976 | Jahn | |
| 4,054,232 A | 10/1977 | Cawley | |
| 4,070,398 A | 1/1978 | Lu | |
| 4,221,841 A | 9/1980 | Hisazumi et al. | |
| 4,264,010 A | 4/1981 | Yoshiga et al. | |
| 4,268,578 A | 5/1981 | Bordini et al. | |
| 4,269,321 A | 5/1981 | Ichinose et al. | |
| 4,330,353 A | 5/1982 | Kunimoto et al. | |
| 4,370,190 A | 1/1983 | Ichinose et al. | |
| 4,402,887 A | 9/1983 | Kuriyama et al. | |
| 4,429,032 A | 1/1984 | Matthe et al. | |
| 4,454,294 A | 6/1984 | Zentner et al. | |
| 4,497,868 A * | 2/1985 | Reinehr et al. | 428/400 |
| 4,574,103 A | 3/1986 | Stamper et al. | |
| 4,646,579 A | 3/1987 | Klein | |
| 4,684,564 A | 8/1987 | Satoh et al. | |
| 4,818,588 A * | 4/1989 | Okabe et al. | 428/201 |
| 5,102,716 A * | 4/1992 | Balmer et al. | 428/158 |
| 5,178,946 A | 1/1993 | Sato et al. | |
| 5,194,498 A | 3/1993 | Stevenson et al. | |
| 5,210,141 A | 5/1993 | Yanagisawa et al. | |
| 5,248,733 A | 9/1993 | Kitamura et al. | |
| 5,304,441 A | 4/1994 | Samuels et al. | |
| 5,635,261 A | 6/1997 | Georgelos et al. | |
| 5,891,529 A | 4/1999 | Harkness et al. | |
| 6,045,902 A | 4/2000 | Imanishi et al. | |
| 6,265,041 B1 | 7/2001 | Maeda | |
| 6,497,868 B1 * | 12/2002 | Tanahashi | 424/78.08 |
| 6,514,606 B2 | 2/2003 | Kinoshita et al. | |
| 6,627,274 B1 * | 9/2003 | Ginossatis et al. | 428/34.9 |
| 6,777,046 B1 * | 8/2004 | Tatarka et al. | 428/34.9 |
| 6,787,220 B2 * | 9/2004 | Wallace et al. | 428/212 |
| 2002/0188077 A1 | 12/2002 | Kumaki et al. | |

* cited by examiner

*Primary Examiner*—Rena Dye
*Assistant Examiner*—Lawrence D. Ferguson
(74) *Attorney, Agent, or Firm*—McAndrews, Held & Malloy, Ltd.

(57) ABSTRACT

A heat sealable film for use in food packaging comprises a resin composition comprising vinyl chloride homopolymer, vinyl chloride-vinyl acetate copolymer and plasticizer in an amount greater than about 15% by weight of the resin composition. In one embodiment, the film is adapted to provide a controlled oxygen transmission of at least 500 cc/in2/24 hours. The embodiment is also adapted to heat seal on conventional packaging equipment.

16 Claims, 8 Drawing Sheets

HEAT SEALABLE POLYVINYL CHLORIDE FILMS

RELATED APPLICATIONS

This application is a continuation-in-part of U.S. application Ser. No. 09/715,874 filed Nov. 17, 2000 titled Polymer Composite Packaging Film for Fresh Meat and Vegetable Produce, filed by Carl M. Sullivan and Thomas E. Hopton.

TECHNICAL FIELD

This invention relates to packaging films for fresh meat and vegetable produce and, in particular, a packaging film that is heat sealable, heat shrinkable and has a controlled gas permeability rate.

BACKGROUND OF THE INVENTION

Optically transparent films useful for covering food product containers and packaging food products are ideally formulated to provide consumers with a clear view of the packaged food product while maintaining its appearance and freshness. Films with oxygen transmission rate (OTR) control properties extend the shelf life of refrigerated freshly cut produce and fresh meat since the presence of either too much or too little oxygen in the package lowers shelf life. For example, in the packaging of lettuce, excessive oxygen in the package results in enzymatic browning of cut surfaces of the lettuce. On the other hand, insufficient oxygen in the package results in lettuce spoilage caused by anaerobiosis. Similarly, fresh meat packaging permits delivery of sufficient oxygen to the myoglobin contained within the meat to maintain its natural red color and thus achieve the fresh looking product preferred by consumers.

Packaging films made from polyvinyl chloride (PVC) and plasticizer have been used to wrap red meat and produce. PVC films provide a sparkling clear view of the packaged product, and, when formulated with plasticizers, exhibit cling and stretch properties. However, it is often desirable to wrap the food product on a tray, heat seal the film around the tray and heat shrink the film. Conventional PVC packaging films have difficulty forming hermetic seals because PVC has a narrow sealing range. The precision required to seal conventional PVC films is too high for manufacturing with conventional packaging equipment.

Packaging films made from olefinic materials can be formulated to control OTR, to seal to themselves and to be heat shrinkable at lower temperatures than conventional PVC films. However, films of olefinic materials are susceptible to surface moisture buildup in the form of small beads that obscure a consumer's view of the product contained in the package. Reducing fog (surface moisture buildup) in olefinic films by adding standard anti-fog agents has been largely unsuccessful. Anti-fog agents are difficult to contain on the film surface because they tend to wash off. Anti-fog agents also interfere with other film surface properties of the olefinic film making it difficult to print and seal.

In other packaging technology areas, films for applications such as contact packaging for bottles or base films for pharmaceutical packaging have used blends of conventional PVC, meaning non-crosslinked PVC resin, and conventional PVC/VA, meaning non-crosslinked PVC/VA resin. For example, U.S. Pat. No. 6,265,041 discloses a film for use as a cover sheet in pharmaceutical packaging. The disclosed film comprises between 1–80% by weight of a PVC resin and 20–99% by weight of a PVC/VA resin. U.S. Pat. No. 4,264,010 discloses a shrink wrap film for contact packaging products, such as a large bottle for carbonated beverages. The disclosed film comprises PVC and 5 to 20 parts by weight PVC/VA.

While the disclosed films comprise PVC/VA and PVC, these films require no controlled OTR and contain only small amounts of plasticizer. For example, in the film disclosed in U.S. Pat. No. 6,265,041, the amount of plasticizer is less than 2% by weight of the resin portion of the film. U.S. Pat. No. 6,265,041 discloses examples of film containing ESO, a plasticizer, in amounts ranging from 1.5 parts by weight out of 114.5 parts of resin composition to about 2.0 parts by weight out of 113 parts of resin composition. Stated in percentages by weight, these amounts range from 1.3% by weight of the resin composition to 1.8% by weight of the resin composition.

For the examples of films with PVC and PVC/VA blends disclosed in U.S. Pat. No. 4,264,010, the amount of plasticizer ranges from 11 to 17 weight parts out of 119.7 parts to 141.7 parts. Stated in percentage by weight, the amount of plasticizer in these examples ranges from about 9% to about 12% by weight of the film.

While homogenous blends of conventional PVC and conventional PVC/VA may have been achieved with these low levels of plasticizer, it has generally been believed that blending highly plasticized PVC with a copolymer such as PVC/VA was too difficult to manufacture commercially. PVC resins are typically blended with a high speed impeller, which creates heat by friction. PVC/VA fuses at a lower temperature than PVC, so PVC/VA will tend to agglomerate and fuse together at the temperatures required to blend PVC. If the PVC/VA forms agglomerates, the PVC/VA agglomerate may discolor when exposed to heat during processing, forming black impurities in any film formed from the blend.

It would be desirable, therefore, to have available a film that is optically transparent and has a controllable OTR. A film that is heat shrinkable and that may be hermetically sealed to itself by conventional packaging equipment is also needed.

SUMMARY OF THE INVENTION

One embodiment of the film comprises a blend of vinyl chloride homopolymer (hereinafter referred to as PVC) and copolymer of vinyl chloride and vinyl acetate (hereinafter referred to as PVC/VA). PVC/VA is sometimes referred to as poly(vinyl chloride—co vinyl acetate). The embodiment comprises about 18% by weight PVC-VA. The embodiment further comprises at least about 15% by weight plasticizer. A homogenous blend of these components was achieved by following the blending steps described in more detail below.

Such a film has several properties beneficial for food packaging film. The film has a broad heat sealing temperature range that allows the film to be sealed on equipment capable of forming hermetic seals. Depending on the particular composition, the film can form a welded, hermetic seal at temperatures ranging from about 200° F. to about 400° F. Sealing time typically ranges up to about 1000 milliseconds.

This embodiment is further capable of sealing over a heat sealing window that is sufficiently broad so that the film may be sealed on conventional packaging equipment. In addition, the film has an OTR of about 500 cc/100 in$^2$/24 hours or greater, which is desirable for food packaging. During processing the film may be either biaxially oriented or uniaxially oriented, depending on the desired shrink properties. When exposed to temperatures ranging from about 180° F. to about 350° F., the film will heat shrink.

Additional aspects and advantages of this invention will be apparent from the following detailed description of specific embodiments, which proceeds with reference to the accompanying drawings.

DETAILED DESCRIPTION OF PREFERRED EMBODIMENTS

Figure 1:
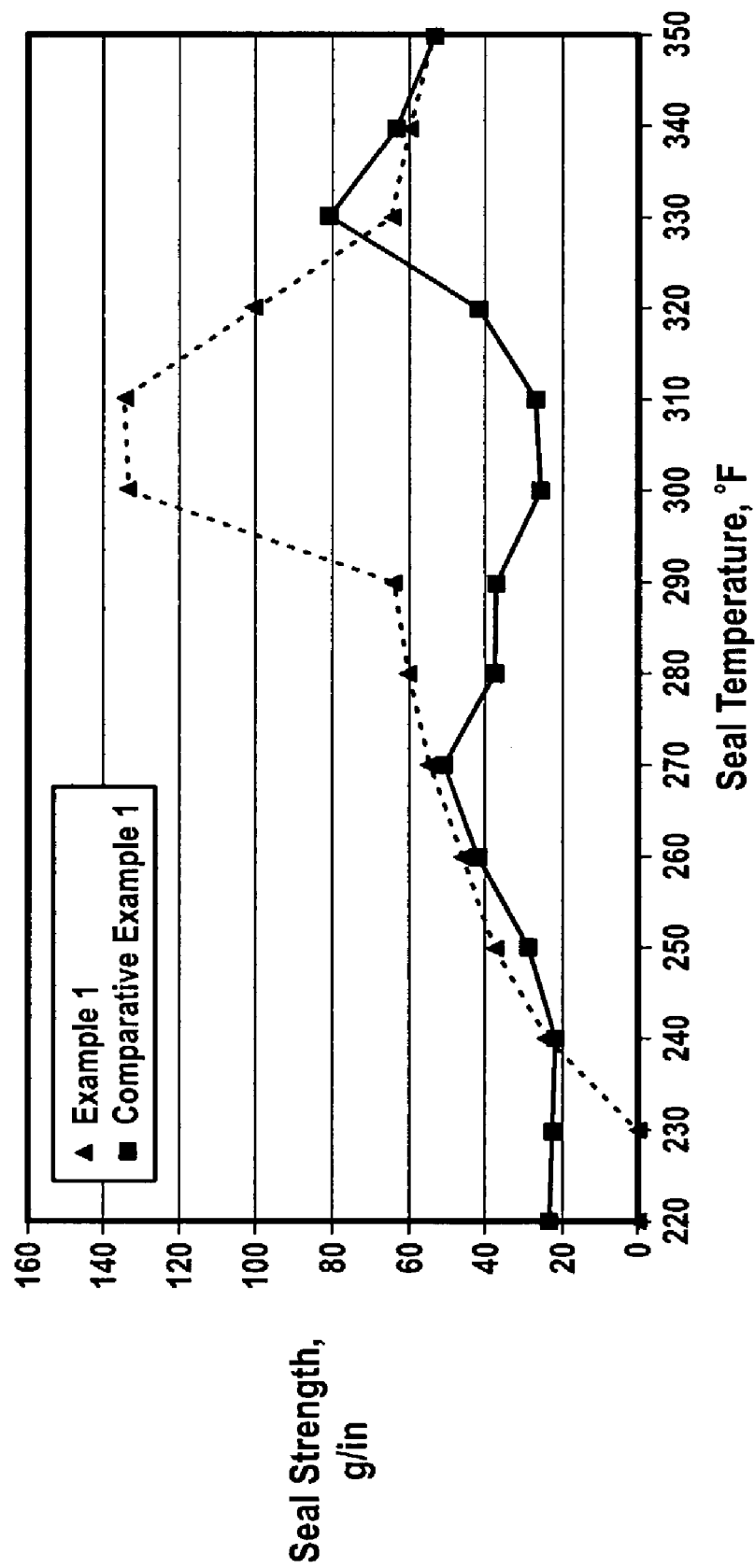
FIG. 1 is a graph of hot tack seal strength of sample film of Example 1 and Comparative Example 1, measured 250 ms following seal formation.

In one embodiment, the film comprises a blend of two polyvinyl chloride resins: vinyl chloride homopolymer and copolymer of vinyl chloride and vinyl acetate. PVC/VA is sometimes referred to as poly(vinyl chloride-co vinyl acetate). The embodiment comprises about 18% by weight PVC-VA. The embodiment further comprises at least 15% by weight plasticizer. A homogenous blend of these components was achieved by following the blending steps described in more detail below.

Such a film has several properties beneficial for food packaging film. The film has a broad heat sealing temperature range that allows the film to be sealed on equipment capable of forming hermetic seals, such as an OSSID 500E wrapping machine. Depending on the particular composition, the film can form a hermetic seal at temperatures ranging from about 200° F. to about 400° F. on conventional packaging equipment. Sealing time typically ranges from about 500 to about 1000 milliseconds.

In one embodiment, the film is capable of forming a welded heat seal at temperatures ranging from about 320° F. to about 400° F. A welded seal is a seal with strength greater than the tear strength of the film, so that the film will tear before the seal separates. In the embodiment discussed above, comprising a homogenous blend of PVC, PVC/VA and at least 15% by weight plasticizer, has a broad heat sealing window, as discussed in greater detail below.

The film of this embodiment has an OTR of about 500 cc/100 in$^2$/24 hours or greater, which is desirable for food packaging. During processing the film may be either biaxially oriented or uniaxially oriented, depending on the desired shrink properties. When exposed to temperatures ranging from about 180° F. to about 350° F., the film will heat shrink.

As mentioned above, PVC refers to vinyl chloride homopolymer. As used herein, PVC refers to polymers formed by conventional PVC-forming processes and does not include crosslinked vinyl chloride polymers, such as those disclosed in U.S. Pat. No. 5,210,141. Suitable examples of PVC include those resins available from Shintech under product numbers 1150 and 1300; those resins available from Georgia Gulf under the tradename PVC 2095; those resins available from OxyVinyls under the product numbers 240, 450, and 455; and those resins available from ESSO under the product numbers 369 and 469.

PVC/VA comprises PVC copolymerized with vinyl acetate and has a melting temperature of less than about 200° F. As used herein, PVC/VA refers to polymers obtained by conventional polymerization processes and does not include cross-linked polymers. In one embodiment, the amount of vinyl acetate monomer incorporated into the PVC/VA copolymer ranges between about 5% to about 15%. In another embodiment, the amount of vinyl acetate monomer incorporated into the PVC/VA copolymer ranges from about 10% to about 13%. Suitable examples of PVC/VA include the following: those resins available from Occidental Chemical Cop. under the tradename Oxychem Oxy 6338; those resins available from Formosa Plastics Formolon under product numbers 171C, 168 and 113; and those resins available from Vinnolit GmbH & Co. of Germany under the tradename Vinnolit S, product numbers 3060/10 and 3157/11.

As discussed in more detail below, the amount of PVC/VA in the film affects the sealing properties of the film. One embodiment of the film comprises PVC/VA in an amount ranging between about 1% to about 30% by weight of the film. Stated otherwise, the amount of PVC/VA incorporated in the film is about 1 to about 30 weight parts, based on 100 weight parts of resin composition.

Resin composition, as used herein, refers to the total PVC, PVC/VA, plasticizer, and other film additives discussed below. Percentage by weight is used below to describe the components of the film, however, one skilled in the art would understand that these percentages may also represent weight parts out of 100 weight parts resin composition. The resin composition may be only a portion of a film that contains additional components, such as particulate fillers. Alternatively, a film may include only the resin compositions disclosed. The amounts of each component discussed above refer to its percentage by weight of the resin composition (including resins, plasticizer and additives), whether stated as a percentage by weight of a film or a percentage by weight of a resin composition, and may not represent the percentage by weight of the entire film, if other components, such as particulate fillers, are added.

Referring to another embodiment, the film comprises PVC/VA in an amount ranging from about 5% to about 20% by weight of the resin composition or film. In yet another embodiment, the amount of PVC/VA ranges from about 10% to about 20% by weight of the resin composition. In still another embodiment, the amount of PVC/VA ranges from about 17% to about 20% by weight of the resin composition.

The PVC and PVC/VA resins are highly plasticized to provide a film with flexibility and elasticity. In one embodiment, the film comprises plasticizer in an amount greater than about 15% by weight of the resin composition. In another embodiment, the film comprises plasticizer in an amount ranging from about 15% to about 40% by weight of the resin composition. In another embodiment, the film comprises plasticizer in an amount ranging from about 15% to about 35% by resin composition weight. In yet another embodiment, the film comprises plasticizer in an amount ranging from about 15% to about 30% by weight of the resin composition. In one embodiment, the film comprises a blend of plasticizers.

Suitable plasticizers for use in the film include di(2ethylhexyl)adipate (DEHA) and epoxidized soybean oil (ESO). ESO acts both as a plasticizer and a stabilizer. For example, the film may comprise DEHA in an amount ranging from about 18% to about 25% by weight of the resin composition and ESO in an amount ranging from about 4% to about 10% by weight of the resin composition. Examples of DEHA include the following: those available from Sunoco under the product number PX-238; those available from Eastman under the tradename Kodaflex DOA; and those available from Solutia under the tradename DOA. Examples of ESO include the following: those available from Acme-Hardesty under the tradename Jenkinol, product number 680M; those available from Crompton Corporation under the tradename Drapex, product number 6.8; those available from Ferro Corporation under the tradename Plascheck, product number 775; those available from Atofina under the tradename Vikoflex, product number 7170; and those available from CP Hall under the tradename Paraplex G-62.

The amount of plasticizer incorporated into the film and the film's thickness control the OTR of the film. As the amount of plasticizer increases and the gauge of the film decreases, the breathability of the film increases. Therefore, if a higher OTR is desired, the plasticizer may be increased. For example, in an embodiment containing plasticizer in an amount of about 26% by weight of the resin composition and a gauge of about 1 mil, the film has an OTR of about 815 cc/100 in$^2$/24 hours. OTR rates for specific examples are discussed in the examples section below. In another embodiment containing plasticizer in an amount of about 23% and a gauge of about 1 mil, the film has an OTR of about 792 cc/100 in$^2$/24 hours. The thickness of the film may also be adjusted to affect OTR. In one embodiment, comprising at least about 15% plasticizer and a thickness of 1 mil, the film has an OTR of at least about 500 cc/100 in$^2$/24 hours. The OTR of this film will increase by twice if the gauge of the film is reduced by half and the OTR will decrease by half if the gauge of the film is doubled. Thus an embodiment with an OTR of 500 cc/100 in$^2$/24 hours at 1 mil would be expected to have an OTR of at least about 1000 cc/100 in$^2$/24 hours at a thickness of 0.5 mil. Similarly, an embodiment, that at 1.0 mil has an OTR of 500 cc/100 in$^2$/24 hours, would be expected to have an OTR of at least about 250 cc/100 in$^2$/24 hours at a thickness of 2 mils. A film of the same composition would be expected to have an OTR of at least about 125 cc/100 in$^2$/24 hours at a thickness of 3 mils.

The film may also comprise additives such as stabilizer, antifog, lubricant, slip agent and antiblock. Suitable examples of stabilizers include tris-nonylphenyl phosphite ("TNPP"), and a blend of calcium and zinc fatty acid soaps ("Ca/Zn"). Examples of TNPP include the following: those available from Witco under the tradename Mark C; those available from Dover Chemical under the tradename Doverphos; those available from Huntsman Chemical under the tradename Weston TNPP; and those available from Uniroyal under the tradenames Wytox 312 and Naugard P. Examples of CaZn include: those available from Cognis under the tradename Stabiol VCZ-2200, those available from Akzo Nobel under the tradename Interstab, product numbers CZL-720 and CZ-11; those available from Ferro Corp under the tradename Thermocheck, product numbers 760X and 760; those available from Blatchford under the tradename Chemstab R6100; and those available from Witco under the tradename Mark 152. In one embodiment, the film comprises stabilizer in an amount up to about 2% by weight of the resin composition. In another embodiment, the film comprises stabilizer in an amount ranging from about 0.4% to about 2% by weight of the composition.

Suitable examples of antifog include: glycerol monooleate, such as those available from American Ingredients under the tradename Pationic, product numbers 1530 and 1087 and from Crompton under the tradename Atmer 400; sorbitan mono-oleate, such as those available from CIBA Specialty Chemical ("CIBA") under the tradename Atmer 105; sorbitan mono-laurate such as those available from CIBA Specialty Chemical ("CIBA") under the tradename Atmer 100; sorbitan mono-stearate such as those available from CIBA under the tradename Atmer 103; poly-oxyethylene (20) sorbitan mono-oleate such as those available from CIBA Specialty Chemical ("CIBA") under the tradename Atmer 116, from Witco under the tradenames Flo-MoSMO 20 and Witconol 2722, from Lonza under the tradename Glycosperse O-20, and from Specialty Ind. Chem. under the tradename Polysorbac 80; and ethoxylated nonylphenol, such as those available from Huntsman Chemical under the tradename Surfonic N-60. In one embodiment, the film comprises antifog in an amount up to about 3% by weight of the resin composition. In another embodiment, the film comprises antifog in an amount ranging from about 0.8% to about 3.5% by weight of the resin composition.

Suitable examples of lubricant include stearic acid, such as stearic acid available from Crompton under the tradenames Hystrene 5016, Emersol 136 and Hystrene 5016 and from Acme Hardesty under the tradename 60RGSA; lauric acid; palmetic acid; and polyethylene wax; such as the waxes available from Allied Signal under the product numbers AC629A and AC316A and from Texas Eastman under the tradename Epolene E-14P. In one embodiment, the film comprises lubricant in an amount ranging from about 0.1% to about 0.6% by weight of the resin composition.

Suitable examples of slip agent include ethylene bisoleamide and erucamide slip. Examples of ethylene bisoleamide include: those available from Crompton under the tradename Kemamide W-20; those available from Croda under the tradename Crodaflex EBO; those available from Morton International under the tradename Advawax 240; and those available from Lonza under the tradename Glycolub VL. Examples of erucamide slip include those available from Crompton under the tradename Kemamide E. In one embodiment, the film contains slip in an amount sufficient to enable the film to shrink around a package without become caught on the edge of the package when the film shrinks. In one embodiment, the film comprises slip agent in an amount ranging from about 0.05% to about 0.6% by weight. In another embodiment, the film comprises slip agent in an amount ranging from about 0.1% to about 0.5% by weight.

Suitable examples of antiblock include: silica antiblock such as those available from Crosfield under the tradename Gasil 144; silica aerogel, such as those available from Grace/Davison under the tradename Syloid 74; and zeospheres, also known as clay microbeads, such as those available from 3M under the product number W210. In one embodiment, the antiblock is present in an amount up to about 0.6% by weight of the resin composition.

The film may be a single layer film. Alternatively, one or more layers of the resin compositions described herein may be included in a film with layers of other compositions.

The embodiments of the film discussed above may be formed by blending PVC homopolymer resin and all additive ingredients in a high intensity mixer, such as a Henschel mixer. Other suitable mixers include Papenmeier mixers and Welex mixers. The action of the mixer drives the temperature of the PVC polymer resin particles by shear and friction to a point at which the particles swell and retain by adsorption the plasticizers, the other liquid additives, solid additives with lower melt points coating the particles and other solid additives dispersed among the PVC resin particles. The PVC resin particles will form a granular free flowing powder called a dry blend. PVC/VA resin is also added during this blending cycle, in which it also adsorbs a share of plasticizers, stabilizers and other additives, and all ingredients become evenly dispersed.

The blend is dropped into a holding and cooling blender at a temperature which is high enough to permit even adsorption of additives among the PVC resin particles and lower than the point at which the resin particles begin to melt or agglomerate into clumps. Suitable holding and cooling blenders include Ribbon Blenders and High Intensity Henschel Cooler. The PVC-VA resin softens and begins to melt at a much lower temperature than the PVC homopolymer resin. As a result the maximum or drop temperature for blending highly plasticized PVC and PVC/VA is lower than a blend PVC homopolymer and plasticizer alone. A lower maximum temperature prevents the PVC/VA resin particles from partially melting and agglomerating into clumps, and allowing the plasticizers and other additives to be uniformly adsorbed into the resin particles. PVC/VA resin, PVC resin and plasticizer, in the amounts described above, can be blended into a homogenous mixture at maximum temperatures less than about 195° F. In another embodiment, the resins and plasticizer, in the amounts described above, can be blended into a homogenous mixtures at maximum temperatures less than about 190° F. In another embodiment, the resins and plasticizer, in the amounts described above, can be blended into a homogenous mixtures at maximum temperatures less than about 185° F. In another embodiment, the PVC, plasticizer, and PVC/VA are blended into a homogeneous mixture at maximum temperatures ranging from 183° F. to about 187° F. As used herein, a homogenous mixture of PVC/VA and PVC refers to a blend in which all materials are evenly distributed, so that a film formed from the blend is smooth and uniform, without gels or lumps.

The finished granular powder blend may be melted and extruded directly into film using a single screw extruder. Alternatively, the powder may be melted and extruded into pellets with a suitable extruder. The pellets are melted and extruded into film by blown or cast film extrusion method, using a single screw extruder. The secondary step of making the powder blend into pellets gives extra mixing to disperse the PVC-VA resin more completely into the film structure. Following extrusion, the film may be irradiated to crosslink polymers in the film.

Following formation of the film, the film is oriented. In one embodiment, the film is oriented in the machine direction in an amount ranging from about 50% to about 400% of its original length. When exposed to temperatures ranging from about 180° F. to about 200° F., the oriented film will shrink less than about 60% of its original length. In one embodiment, the film is biaxially oriented, about 50% to about 400% of its original length in both the machine direction and the transverse direction. When exposed to temperatures ranging from about 180° F. to about 200° F., the film will heat shrink less than 80% in the machine and transverse directions. In one embodiment, the biaxially oriented film will heat shrink between about 30% to about 50% in both the machine and transverse directions. The film may be biaxially oriented with a double bubble method. Alternatively, the film may be biaxially oriented using a tenter frame and a machine direction orienter.

The embodiments discussed above provide good OTR, with an OTR of at least 500 cc/100 inches/24 hours for a film with a thickness of about 1 mil. Also, as discussed above, the OTR can be controlled by varying the amount of plasticizer in the film. The embodiments discussed above are also capable of forming a welded heat seal on conventional packaging equipment, such as an OSSID 500E. Heat seals are permanent bonds between layers of film by the application of pressure and heat over a specified period of time, the dwell time. A heat seal is generally formed by causing the film surfaces to melt and flow together. Unlike other polymer film structures, plasticized PVC does not have a sharp or well defined melt point, but goes through progressive softening levels. PVC is an amorphous non-crystalline polymer, and with the addition of relatively large amounts of plasticizer and other additives, forms a rubbery state.

Additionally, the embodiments described above are capable of forming welded seal at a wide temperature window. PVC films may form three types of heat seals: cling seals, heat tack (or peel) seals and welded seals, the first two of which are false seals. The true heat seal is called a welded seal, and is defined by being as strong or stronger than the surrounding film. When attempting to separate the layers of a welded seal, the adjacent film tears before the seal itself. Thus a welded seal has a strength equivalent to or greater than the film's tear strength.

As mentioned above, in one embodiment the inventive film has a broad heat sealing window over which the film can form a welded seal. A broad heat sealing window permits manufacturing equipment to overshoot the sealing temperature to provide a complete seal without burning the films. The heat sealing window is the difference between the temperature at which the film begins to form a welded seal and the temperature at which the film begins to burn through. Burn through means that the film separates and forms holes or begins to disintegrate in response to heat. The heat sealing window is determined by the amount of PVC/VA included in the film. Additives can also affect the heat sealing window and the sealing temperatures of the films. For example, in an embodiment of the film comprising 61% PVC, 28% plasticizer and 12% PVC/VA, the film begins to seal at 313° F. and begins to burn through when exposed to temperatures of about 398° F. The difference between the beginning sealing temperature, 313° F., and the burn through temperature, about 398° F., is the heat sealing range. For this embodiment, the heat sealing window is 85° F. More examples and their heat sealing ranges are discussed below.

In one embodiment, the film is capable of forming a welded heat seal above about 320° F. and has a heat sealing window greater than about 20° F. In another embodiment the film has a heat seal window greater than 30° F. In yet another embodiment, the heat sealing window is greater than 40° F. The heat sealing temperature range refers the range of temperatures over which the film may form a welded heat seal. For example, for a film with a heat sealing range of 40° F., if the film begins to seal at 300° F., the film will be able to seal at temperatures up to 340° F.

Other, less desirable, seals may be formed at low temperatures, such as delaminating seals and cling seals.

Delaminating seals appear to be welded, but can be worked loose or can be separated by hand peeling at the interface between the sealed layers. Cling seals are the result of a film's cling or electrostatic attraction and also stress relaxation (dead fold) properties as the surfaces wet together. Cling seals are more easily loosened or separated than the delaminating seal during package handling or transportation. Cling seals are also easily separated by hand, and are affected by moisture. A cling seal may occur at room temperature with sufficient pressure and time.

In addition to being capable of forming welded seals on conventional equipment, the embodiments described above have good hot tack seal strength. Hot tack refers to the strength of the seal immediately following sealing and before the seal has fully cooled. Typically, film used to wrap food products on a tray is oriented and is heat shrinkable. When the film is heat sealed around a product, the film will shrink somewhat in response to the heat used to seal the film. If the film does not have sufficient hot tack seal strength, the seal can come apart in response to shrinking immediately upon heat sealing. In addition, in a manufacturing plant, the wrapped product proceeds to a heat shrinking tunnel just after the film is heat sealed. As a result, the seal may not have cooled completely before the film heat shrinks around the product. Good hot tack seal strength helps keep the seal intact when the film heat shrinks following formation of the heat seal. In one embodiment, the film forms a seal with a hot tack seal strength of at least 60 grams/mil over a broad range of temperatures.

Seal strength is expressed in grams/mil (also referred to as g/mil or grams force per mil of thickness) or grams/in (also referred to as g/in or grams force per inch) in the description above and in the examples below. Grams/mil may be converted into N/mm (Newtons per millimeter of thickness) by the following equation: g/mil×0.386=N/mm. Grams/in may be converted into N/m (Newtons per meter) by the following equation: g/inch×0.386=N/m.

EXAMPLES

Specific embodiments of the film are described in detail below, but the invention is not limited by these examples. In each of the examples below, the PVC and PVC/VA, if included, were blended in a high intensity blender with plasticizers and any other additives. The resulting powder was extruded into pellets and the pellets were extruded into film, forming film samples. Sealing properties, tear strength and OTR were measured for Examples 1–3. In addition, hot tack seal strength of the sample films were tested by sealing at temperatures ranging from 220° F. to 350° F. The sample films were sealed in a fin seal with sealing jaws at 60 psi of pressure with a dwell time of 1000 milliseconds or 500 milliseconds, as specified below. The hot tack seal strengths for each sealing temperature were measured at 500 milliseconds or 250 milliseconds following seal formation. Note that seal strengths of less than 20 g/in can be caused by cling between the film and may not be the result of heat sealing.

Example 1

The sample films of Example 1 comprise: 54.84% by weight PVC, 12.46% by weight PVC/VA, and 28.27% by weight plasticizer. The films of Example 1 further comprise minor amounts of additives: 1.47% by weight stabilizer, 2.02% by weight antifog, 0.24% by weight slip, 0.1% by weight lubricant, 0.17% by weight slip, and 0.44% by weight antiblock.

A film of Example 1 was formed with a gauge of 1 mil. The film was tested for OTR and for heat sealing characteristics. The film had an OTR of 1025.9 cc/100 in$^2$/24 hours. The film formed a welded seal, beginning at a temperature of 328° F. and a burn through temperature of 421° F., providing a 93° F. heat sealing window.

Comparative Example 1

The sample films of Comparative Example 1 comprise: 68.51% by weight PVC, 0% PVC/VA, and 28.09% by weight plasticizer. The Comparative Example 1 film samples further comprise minor amounts of additives: 2.06% by weight stabilizer, 1.16% by weight antifog, 0.18% by weight lubricant and 0.14% by weight slip.

Figure 2:
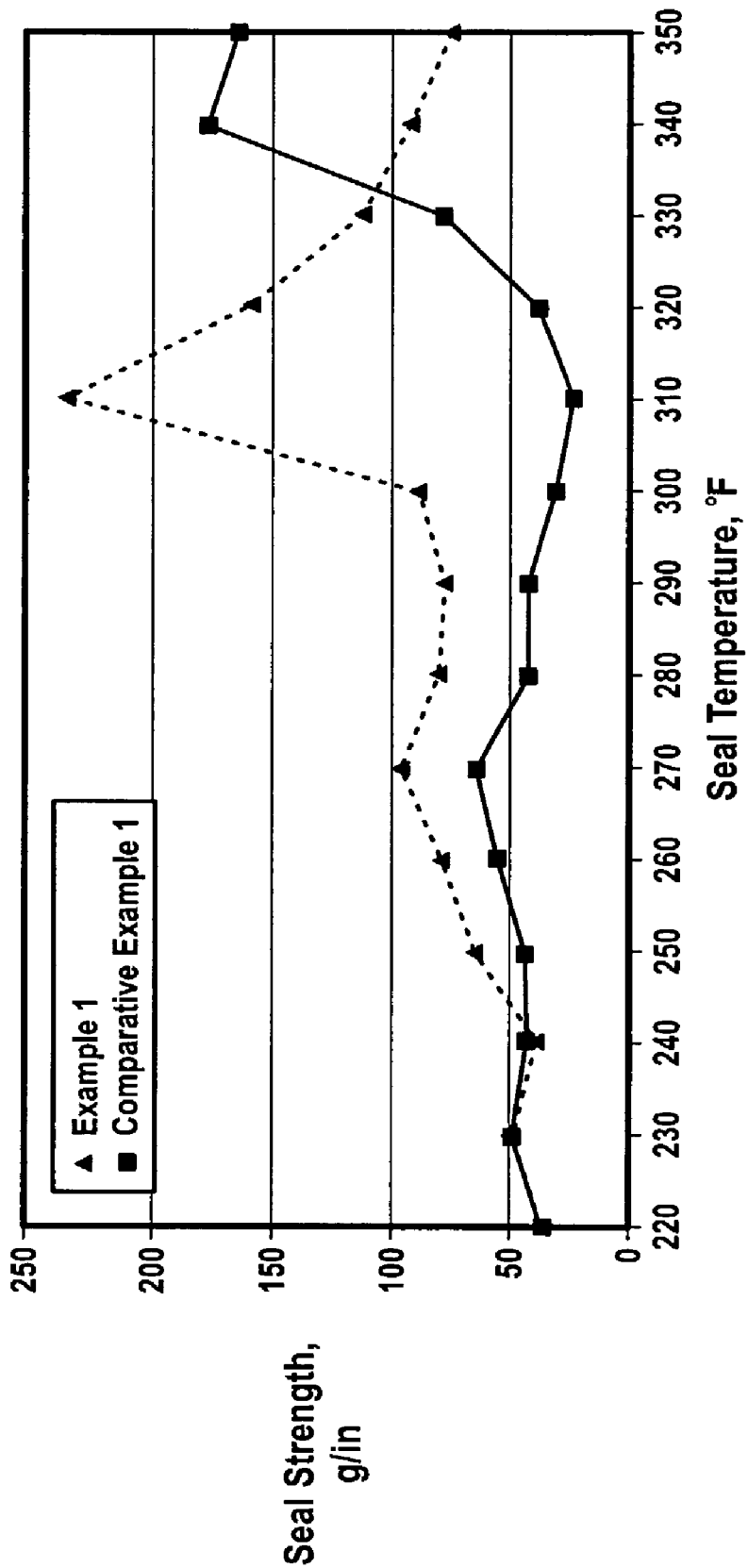
FIG. 2 is a graph of hot tack seal strength of sample films of Example 1 and Comparative Example 1, measured 500 ms following seal formation.

Three sample films of Example 1 and Comparative Example 1 were extruded and tested by the methods discussed above. FIG. 1 shows the hot tack seal strength over seal temperature for samples of Example 1 and Comparative Example 1, measured 250 milliseconds following release of the sealing jaws. FIG. 2 shows seal strengths over seal temperature, measured 500 millisecond following release of the sealing jaws. For the data shown in both FIGS. 1 and 2, the film was sealed with a dwell time of 500 milliseconds. The data from this testing for Example 1 is shown in Table A, for 250 milliseconds following sealing, and in Table B, for 500 milliseconds following sealing. For Comparative Example 1, the results of testing are shown in Tables C, for 250 ms following sealing, and in Table D, for 500 ms following sealing.

TABLE A

| | (250 ms) Example 1 Seal Temperature (° F.) | | | | | | | | | | | | |
|---|---|---|---|---|---|---|---|---|---|---|---|---|---|
| | 220 | 230 | 240 | 250 | 260 | 270 | 280 | 290 | 300 | 310 | 320 | 330 | 340 | 350 |
| Sample 1 Seal (g/in) | 0 | 0 | 27 | 39 | 48 | 48 | 57 | 64 | 92 | 115 | 97 | 64 | 58 | 53 |
| Sample 2 Seal (g/in) | 0 | 0 | 23 | 37 | 44 | 55 | 64 | 60 | 161 | 143 | 124 | 65 | 64 | 55 |
| Sample 3 Seal (g/in) | 0 | 0 | 25 | 37 | 46 | 62 | 62 | 69 | 150 | 147 | 81 | 67 | 60 | 55 |
| Avg. Seal (g/in) | 0 | 0 | 25 | 38 | 46 | 55 | 61 | 64 | 134 | 135 | 101 | 65 | 61 | 54 |

TABLE B (500 ms)
Example 1
Seal Temperature (° F.)

|  | 220 | 230 | 240 | 250 | 260 | 270 | 280 | 290 | 300 | 310 | 320 | 330 | 340 | 350 |
|---|---|---|---|---|---|---|---|---|---|---|---|---|---|---|
| Sample 1 Seal (g/in) | 0 | 0 | 42 | 65 | 83 | 79 | 71 | 78 | 103 | 269 | 196 | 106 | 81 | 69 |
| Sample 2 Seal (g/in) | 0 | 0 | 39 | 67 | 72 | 81 | 88 | 73 | 76 | 267 | 124 | 117 | 103 | 65 |
| Sample 3 Seal (g/in) | 0 | 0 | 42 | 65 | 3 | 129 | 83 | 83 | 87 | 170 | 152 | 111 | 92 | 90 |
| Avg. Seal g/in) | 0 | 0 | 41 | 66 | 79 | 96 | 81 | 78 | 89 | 235 | 157 | 111 | 92 | 75 |

TABLE C (250 ms)
Comparative Example 1
Seal Temperature (° F.)

|  | 220 | 230 | 240 | 250 | 260 | 270 | 280 | 290 | 300 | 310 | 320 | 330 | 340 | 350 |
|---|---|---|---|---|---|---|---|---|---|---|---|---|---|---|
| Sample 1 Seal (g/in) | 25 | 28 | 18 | 23 | 37 | 62 | 48 | 35 | 35 | 19 | 44 | 80 | 74 | 49 |
| Sample 2 Seal (g/in) | 21 | 18 | 30 | 35 | 57 | 51 | 32 | 39 | 32 | 41 | 37 | 90 | 55 | 53 |
| Sample 3 Seal (g/in) | 25 | 23 | 19 | 30 | 32 | 41 | 32 | 39 | 12 | 21 | 44 | 74 | 62 | 57 |
| Ave. Seal (g/in) | 24 | 23 | 22 | 29 | 42 | 51 | 37 | 38 | 26 | 27 | 42 | 81 | 64 | 53 |

TABLE D (500 ms)
Comparative Example 1
Seal Temperature (° F.)

|  | 220 | 230 | 240 | 250 | 260 | 270 | 280 | 290 | 300 | 310 | 320 | 330 | 340 | 350 |
|---|---|---|---|---|---|---|---|---|---|---|---|---|---|---|
| Sample 1 Seal (g/in) | 42 | 71 | 41 | 39 | 60 | 83 | 57 | 44 | 35 | 19 | 44 | 65 | 129 | 134 |
| Sample 2 Seal (g/in) | 30 | 37 | 51 | 48 | 64 | 53 | 30 | 39 | 48 | 35 | 34 | 62 | 197 | 148 |
| Sample 3 Seal (g/in) | 39 | 41 | 39 | 44 | 41 | 55 | 44 | 46 | 11 | 18 | 35 | 106 | 201 | 205 |
| Avg. Seal (g/in) | 37 | 50 | 44 | 44 | 55 | 64 | 44 | 43 | 31 | 24 | 38 | 78 | 176 | 162 |

As discussed above, films for packaging fresh produce should be capable of sealing along a temperature range that is sufficiently broad to allow conventional heat sealing equipment to create a reliable seal that will remain intact when the film heat shrinks as a result of heat sealing and proceeds into a heat shrinking tunnel immediately following sealing. As shown by the graphs in FIGS. 1 and 2 and the data from Table A–D, the film of Example 1 (a blend of plasticized PVC and PVC/VA copolymer) achieves greater seal strength than the film of Comparative Example 1 (PVC without PVC/VA), over sealing temperatures ranging from 240° F. to 320° F. The film of Example 1 also achieves hot tack seal strengths over 60 g/in at temperatures ranging from 280° F. to 320° F.

Example 2

The sample films of Example 2 comprise: 54.92% by weight PVC; 12.48% PVC/VA; and 28.31% by weight plasticizer. The sample films further comprise minor amounts of additives: 1.47% by weight of stabilizer; 2.02% by weight antifog; 0.33% by weight slip; 0.17% by weight lubricant; and 0.30% by weight antiblock.

A film of Example 2 was formed with a gauge of 1 mil. The film was tested for OTR and for heat sealing characteristics. The film had an OTR of 904 cc/100 in 2/24 hours. The film formed a welded seal beginning at a temperature of 313° F. and a burn through temperature of 398° F., providing an 85° F. heat sealing window.

Three samples of Example 2 were tested for hot tack seal strength. The data from this testing is shown in Tables E–F.

Figure 3:
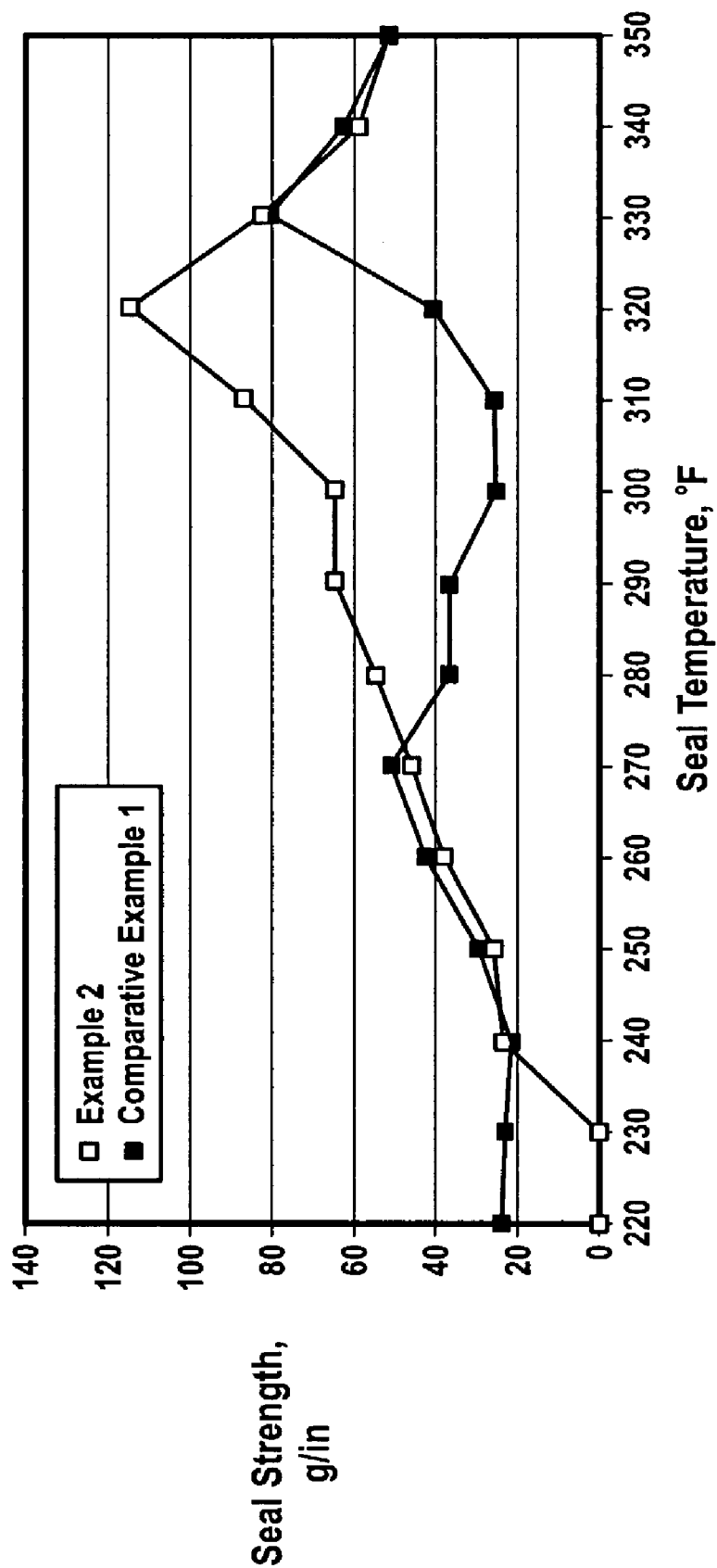
FIG. 3 is a graph of hot tack seal strength of sample films of Example 2 and Comparative Example 1, measured 250 ms following seal formation.
Figure 4:
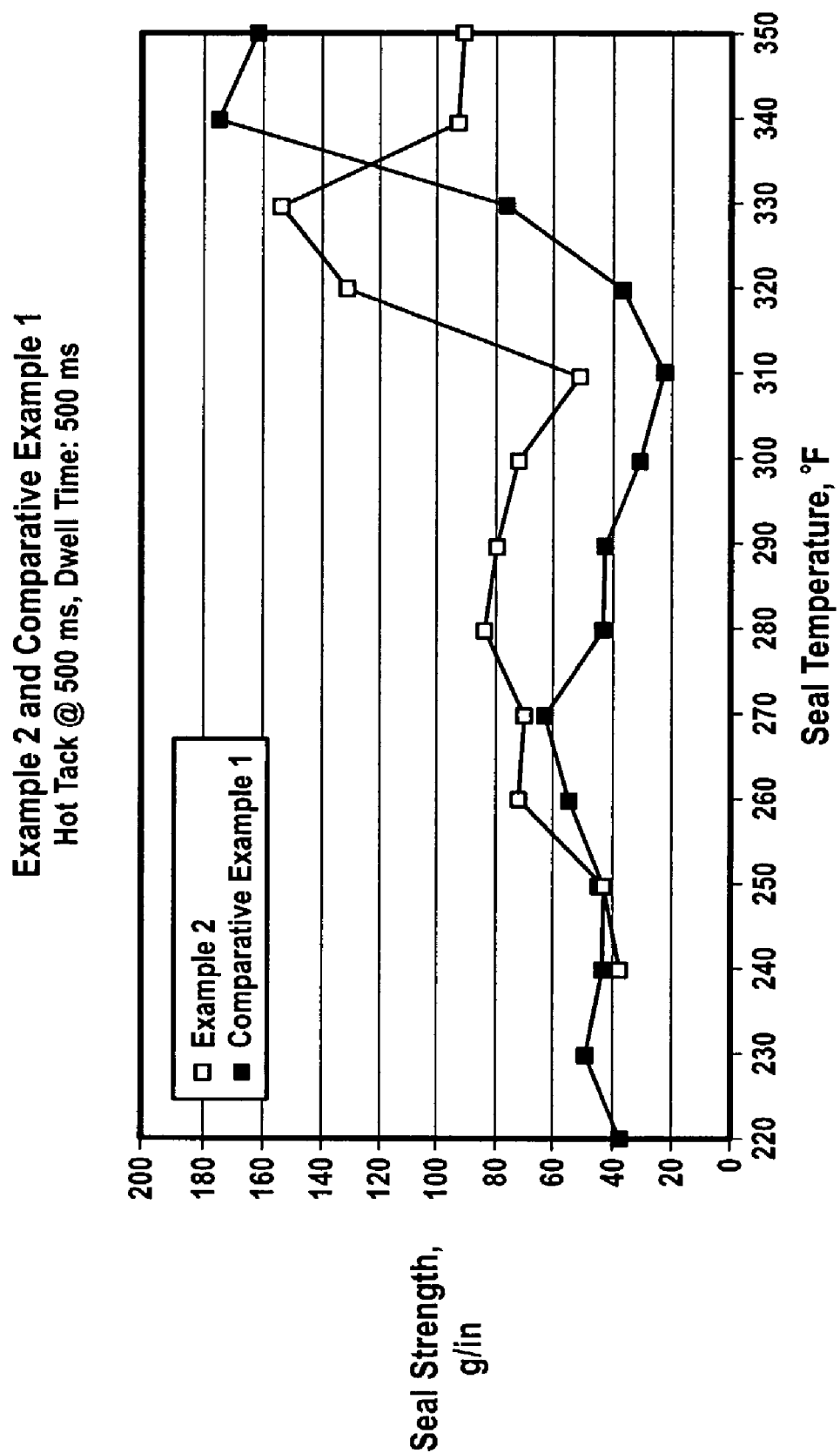
FIG. 4 is a graph of hot tack seal strength of sample films of Example 2 and Comparative Example 1, measured 500 ms following seal formation.

FIG. 3 is a graph of the hot tack heat seal data 250 ms following sealing as shown in Table E (Example 2) and Table C (Comparative Example 1). FIG. 4 is a graph of hot tack heat seal 500 ms following sealing, as shown in Table F (Example 2) Table D (Comparative Example 1).

TABLE E (250 ms)  
Example 2  
Seal Temperature (° F.)

|  | 220 | 230 | 240 | 250 | 260 | 270 | 280 | 290 | 300 | 310 | 320 | 330 | 340 | 350 |
|---|---|---|---|---|---|---|---|---|---|---|---|---|---|---|
| Sample 1 Seal (g/in) | 0 | 0 | 21 | 28 | 37 | 48 | 58 | 60 | 66 | 64 | 113 | 92 | 58 | 51 |
| Sample 2 Seal (g/in) | 0 | 0 | 25 | 30 | 39 | 48 | 57 | 65 | 64 | 118 | 110 | 85 | 65 | 55 |
| Sample 3 Seal (g/in) | 0 | 0 | 25 | 21 | 41 | 46 | 51 | 69 | 65 | 83 | 124 | 71 | 58 | 53 |
| Ave. Seal (g/in) | 0 | 0 | 24 | 26 | 39 | 47 | 55 | 65 | 65 | 88 | 116 | 83 | 60 | 53 |

TABLE F (500 ms)  
Example 2  
Seal Temperature (° F.)

|  | 220 | 230 | 240 | 250 | 260 | 270 | 280 | 290 | 300 | 310 | 320 | 330 | 340 | 350 |
|---|---|---|---|---|---|---|---|---|---|---|---|---|---|---|
| Sample 1 Seal (g/in) | 0 | 0 | 41 | 42 | 71 | 76 | 96 | 80 | 71 | 44 | 111 | 170 | 95 | 76 |
| Sample 2 Seal (g/in) | 0 | 0 | 44 | 48 | 60 | 69 | 81 | 85 | 71 | 81 | 127 | 149 | 101 | 120 |
| Sample 3 Seal (g/in) | 0 | 0 | 30 | 42 | 87 | 64 | 76 | 76 | 78 | 32 | 163 | 147 | 87 | 78 |
| Avg. Seal (g/in) | 0 | 0 | 38 | 44 | 73 | 70 | 84 | 80 | 73 | 52 | 134 | 155 | 94 | 91 |

As can be seen by the data in the above tables and by FIGS. 3 and 4, Example 2 provides higher tack seal strength than Comparative Example 1 over a broad temperature range.

Examples 2–3

Sample films of Examples 2 and 3 were formed by the steps described above. Example 2 sample films comprise the composition disclosed above. Example 3 sample films comprise: 61.16% by weight PVC, 6.24% PVC/VA, 28.31% by weight plasticizer. The films of Example 3 further comprise minor amounts of additives: 1.48% by weight stabilizer, 2.02% by weight stabilizer, 0.33% by weight slip, 0.17% by weight lubricant, and 0.30% by weight antiblock.

A film of Example 3 was formed with a gauge of 1 mil. The film was tested for OTR and for heat sealing characteristics. The film had a OTR of 818.8 cc/100 in$^2$/24 hours. The film formed a welded seal, beginning at a temperature of 3560 and a burn through temperature of 416°, providing a 60° F. heat sealing window.

Figure 5:
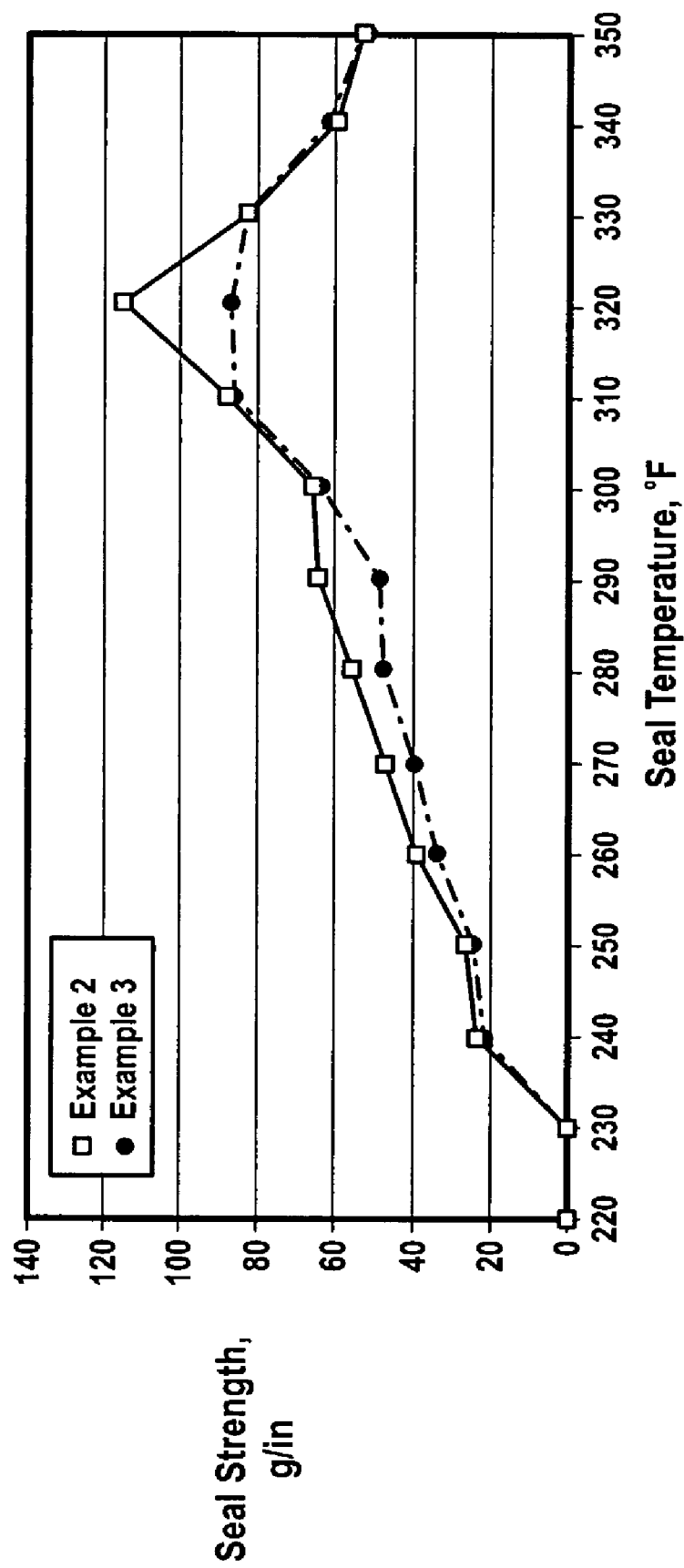
FIG. 5 is a graph of hot tack seal strength of sample films of Example 2 and Example 3, measured 250 ms following seal formation.
Figure 6:
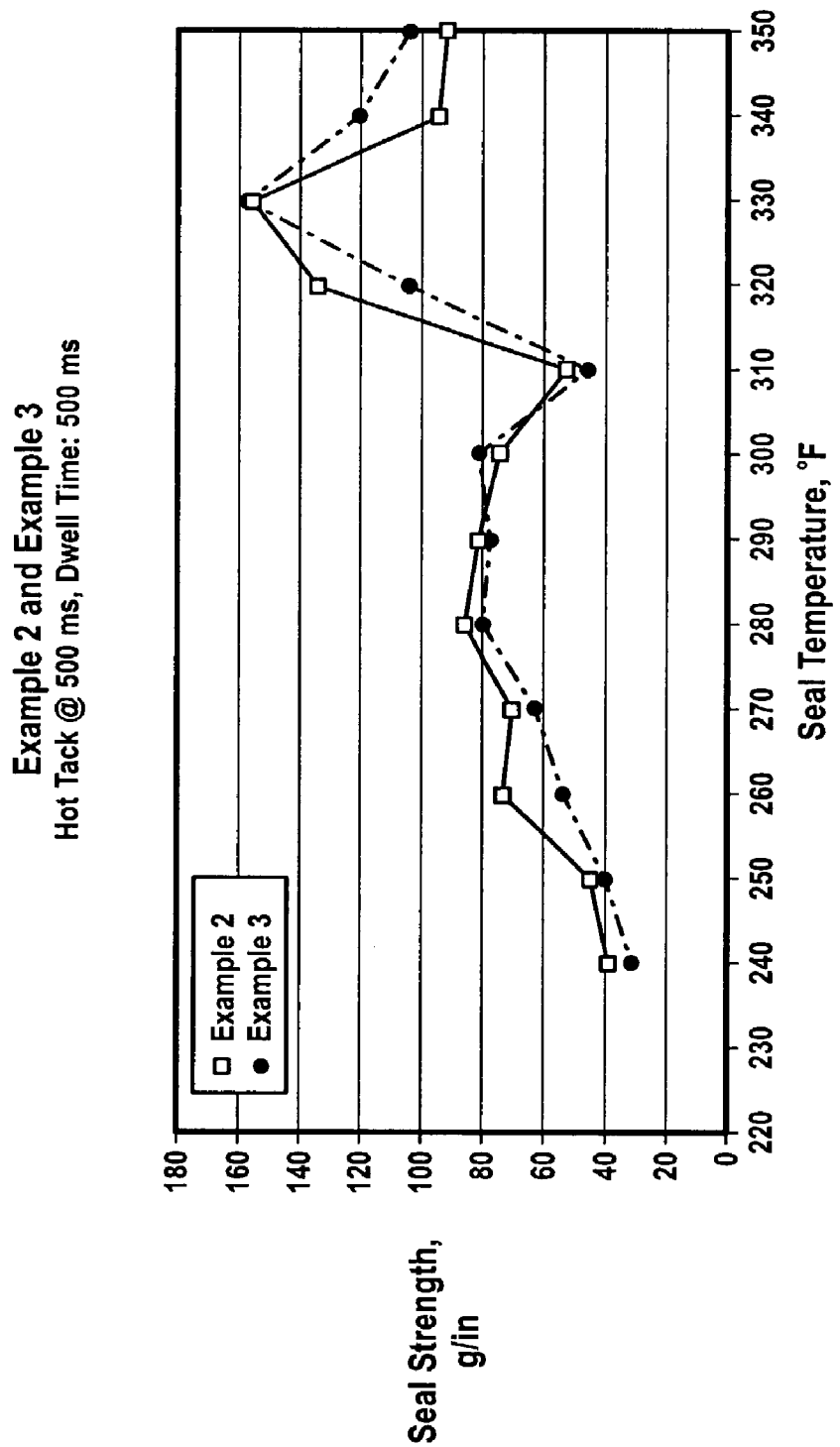
FIG. 6 is a graph of hot tack seal strength of sample films of Example 2 and Example 3, measured 500 ms following seal formation.
Figure 7:
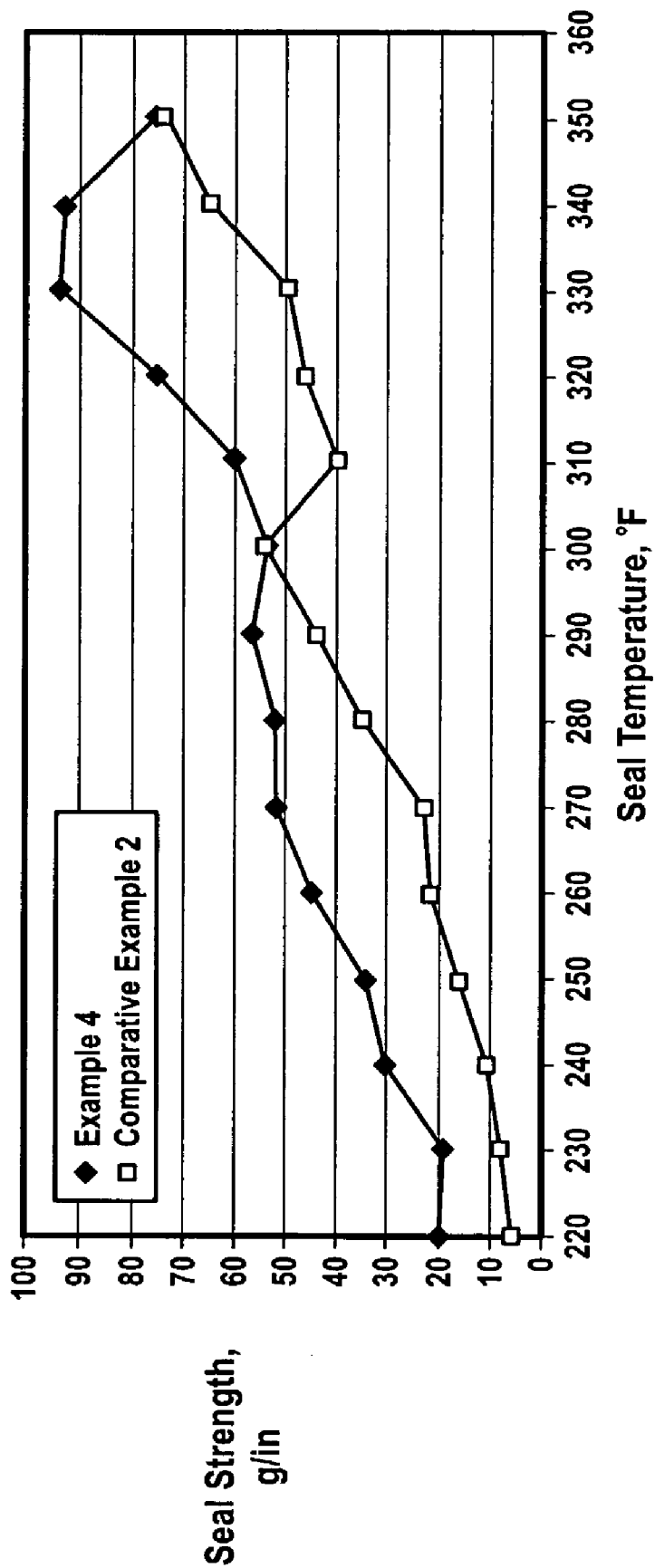
FIG. 7 is a graph of hot tack seal strength of sample of Example 4 and Comparative Example 2, measured 250 ms following seal formation.
Figure 8:
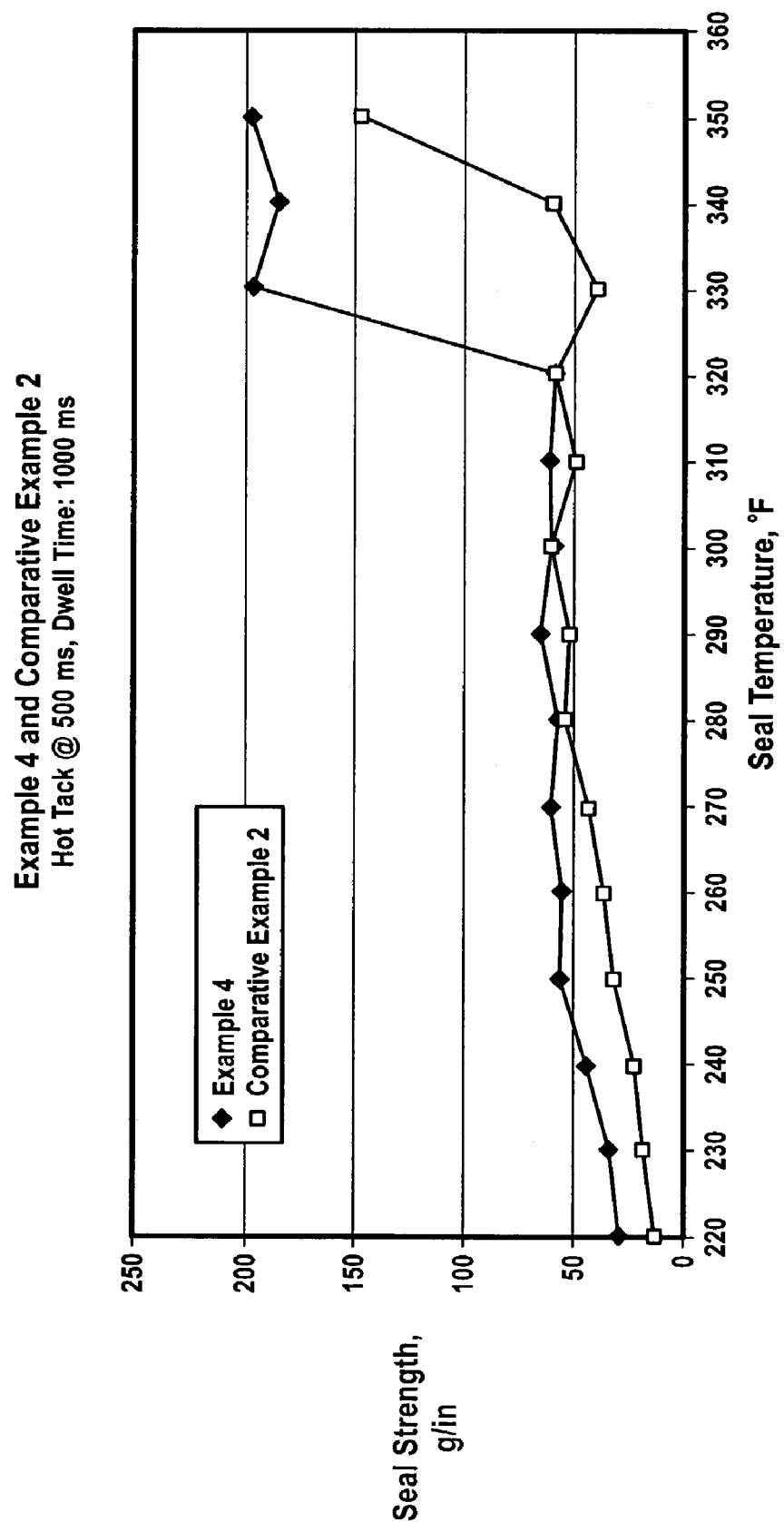
FIG. 8 is a graph of hot tack seal strength of sample of Example 4 and Comparative Example 2, measured 500 ms following seal formation.

Table E above and Table G below show hot tack heat seal strengths for Examples 2 and 3 over different sealing temperatures, measured 250 milliseconds following heat sealing. Table F above and Table H, below show heat seal strengths for Examples 2 and 3 from sealing at temperatures ranging from 220° F. to 350° F. FIG. 5 is a graph of the data in Tables E and G and FIG. 6 is a graph of the data in Tables F and H.

TABLE G (250 ms)  
Example 3  
Seal Temperature (° F.)

|  | 220 | 230 | 240 | 250 | 260 | 270 | 280 | 290 | 300 | 310 | 320 | 330 | 340 | 350 |
|---|---|---|---|---|---|---|---|---|---|---|---|---|---|---|
| Sample 1 Seal (g/in) | 0 | 0 | 23 | 35 | 34 | 39 | 49 | 57 | 55 | 81 | 97 | 69 | 64 | 44 |
| Sample 2 Seal (g/in) | 0 | 0 | 21 | 19 | 41 | 37 | 46 | 46 | 73 | 127 | 64 | 83 | 58 | 53 |
| Sample 3 Seal (g/in) | 0 | 0 | 21 | 18 | 27 | 42 | 49 | 44 | 69 | 50 | 99 | 94 | 62 | 57 |
| Avg. Seal (g/in) | 0 | 0 | 22 | 24 | 34 | 39 | 48 | 49 | 66 | 86 | 87 | 82 | 61 | 51 |

TABLE H (500 ms)
Example 3
Seal Temperature (° F.)

|  | 220 | 230 | 240 | 250 | 260 | 270 | 280 | 290 | 300 | 310 | 320 | 330 | 340 | 350 |
|---|---|---|---|---|---|---|---|---|---|---|---|---|---|---|
| Sample 1 Seal (g/in) | 0 | 0 | 34 | 55 | 49 | 60 | 81 | 74 | 60 | 53 | 106 | 170 | 106 | 80 |
| Sample 2 Seal (g/in) | 0 | 0 | 25 | 37 | 64 | 64 | 83 | 76 | 90 | 48 | 73 | 134 | 113 | 126 |
| Sample 3 Seal (g/in) | 0 | 0 | 34 | 28 | 46 | 62 | 74 | 81 | 90 | 34 | 131 | 166 | 140 | 103 |
| Avg. Seal (g/in) | 0 | 0 | 31 | 40 | 53 | 62 | 79 | 77 | 80 | 45 | 103 | 157 | 120 | 103 |

As discussed above, the films of Example 3 comprise 6.24% by weight PVC/VA and the films of Example 2 comprise 12.48% by weight PVC/VA. As shown in FIGS. 5 and 6, both Examples 2 and 3 provide films with broad heat sealing temperature ranges and good hot tack seal strength.

Examples 4 and Comparative Example 2

The sample films of Example 4 comprise: 55.87% by weight PVC, 10.00 PVC/VA, and 18.99% by weight plasticizer. The films of Example 4 further comprise minor amounts of additives: 1.56% by weight stabilizer; 0.96% antifog; 0.12% by weight slip, 0.23% lubricant; and 2.27% by weight antiblock.

The sample films of Comparative Example 2 comprise: 68.06% by weight of PVC; 0% by weight of PVC/VA; and 26.24% by weight of plasticizer. The films of Example 5 further comprise additives: 1.48% by weight stabilizer; 1.23% by weight of antifog; 0.13% by weight of slip; 0.24% by weight lubricant; and 2.46% by weight antiblock.

Three sample films of Example 4 and for Comparative Example 2 were tested for hot tack seal strength. The data from this testing is shown in Tables I–L.

TABLE I (500 ms)
Example 4
Seal Temperature (° F.)

|  | 220 | 230 | 240 | 250 | 260 | 270 | 280 | 290 | 300 | 310 | 320 | 330 | 340 | 350 |
|---|---|---|---|---|---|---|---|---|---|---|---|---|---|---|
| Sample 1 Seal (g/in) | 14 | 18 | 27 | 30 | 37 | 69 | 53 | 64 | 53 | 65 | 64 | 80 | 113 | 67 |
| Sample 2 Seal (g/in) | 23 | 18 | 37 | 32 | 57 | 37 | 57 | 41 | 60 | 65 | 60 | 110 | 88 | 83 |
| Sample 3 Seal (g/in) | 25 | 21 | 27 | 41 | 42 | 50 | 48 | 67 | 51 | 51 | 103 | 94 | 80 | 80 |
| Avg. Seal (g/in) | 21 | 19 | 30 | 34 | 45 | 52 | 53 | 57 | 55 | 60 | 76 | 95 | 94 | 77 |

TABLE J (500 ms)
Example 4
Seal Temperature (° F.)

|  | 220 | 230 | 240 | 250 | 260 | 270 | 280 | 290 | 300 | 310 | 320 | 330 | 340 | 350 |
|---|---|---|---|---|---|---|---|---|---|---|---|---|---|---|
| Sample 1 Seal (g/in) | 26 | 30 | 42 | 49 | 51 | 65 | 60 | 83 | 57 | 72 | 46 | 191 | 159 | 207 |
| Sample 2 Seal (g/in) | 28 | 37 | 55 | 51 | 57 | 48 | 57 | 42 | 80 | 44 | 53 | 191 | 173 | 203 |
| Sample 3 Seal (g/in) | 34 | 37 | 37 | 67 | 57 | 71 | 53 | 72 | 42 | 67 | 74 | 205 | 218 | 179 |
| Avg. Seal (g/in) | 29 | 35 | 45 | 56 | 55 | 61 | 57 | 66 | 60 | 61 | 58 | 196 | 183 | 196 |

TABLE K

| | (500 ms) Comparative Example 2 Seal Temperature (° F.) | | | | | | | | | | | | | |
|---|---|---|---|---|---|---|---|---|---|---|---|---|---|---|
| | 220 | 230 | 240 | 250 | 260 | 270 | 280 | 290 | 300 | 310 | 320 | 330 | 340 | 350 |
| Sample 1 Seal (g/in) | 4 | 5 | 12 | 16 | 21 | 28 | 35 | 44 | 71 | 34 | 51 | 42 | 83 | 80 |
| Sample 2 Seal (g/in) | 9 | 11 | 9 | 14 | 28 | 25 | 30 | 55 | 48 | 46 | 51 | 53 | 49 | 74 |
| Sample 3 Seal (g/in) | 4 | 9 | 12 | 18 | 16 | 18 | 41 | 35 | 46 | 41 | 39 | 55 | 64 | 69 |
| Avg. Seal (g/in) | 6 | 8 | 11 | 16 | 22 | 24 | 35 | 45 | 55 | 40 | 47 | 50 | 65 | 74 |

TABLE L

| | (500 ms) Comparative Example 2 Seal Temperature (° F.) | | | | | | | | | | | | | |
|---|---|---|---|---|---|---|---|---|---|---|---|---|---|---|
| | 220 | 230 | 240 | 250 | 260 | 270 | 280 | 290 | 300 | 310 | 320 | 330 | 340 | 350 |
| Sample 1 Seal (g/in) | 12 | 16 | 27 | 30 | 34 | 41 | 60 | 55 | 58 | 51 | 60 | 34 | 71 | 147 |
| Sample 2 Seal (g/in) | 18 | 19 | 21 | 30 | 37 | 42 | 49 | 51 | 58 | 58 | 57 | 42 | 51 | 150 |
| Sample 3 Seal (g/in) | 12 | 21 | 21 | 35 | 37 | 48 | 51 | 50 | 62 | 41 | 58 | 41 | 57 | 141 |
| Avg. Seal (g/in) | 14 | 19 | 23 | 32 | 36 | 44 | 53 | 52 | 59 | 50 | 58 | 39 | 60 | 146 |

Similar to the results seen in FIGS. 1–2 for Example 1 and Comparative Example 1, Example 4 has a broader heat seal range than Comparative Example 2. Example 4 also provides good hot tack seal strengths over a wide range of sealing temperatures.

It will be obvious to those having skill in the art that many changes may be made to the details of the above-described embodiments without departing from the underlying principles of the invention. The scope of the present invention should, therefore, be determined only by the following claims.

The invention claimed is:

1. A heat sealable film for use in food packaging comprising a film formed from a resin composition comprising: a blend of polyvinyl chloride; copolymer of vinyl chloride and vinyl acetate; and plasticizer in an amount greater than about 15% by weight of the resin composition;
   wherein the film is adapted to heat seal to itself; and
   wherein the film is biaxially oriented and heat shrinks in an amount less than 80% of its original length at about 195° F.

2. The heat sealable film of claim 1, wherein the plasticizer is present in an amount greater than about 20% by weight of the resin composition.

3. The heat sealable film of claim 1, wherein the plasticizer is present in an amount ranging from about 15% to about 40% by weight of the resin composition.

4. The heat sealable film of claim 1, wherein the plasticizer is present in an amount ranging from about 15% to about 30% by weight of the resin composition.

5. The heat sealable film of claim 1, wherein the film comprises copolymer of vinyl chloride and vinyl acetate in an amount ranging from about 1% to about 30% by weight of the resin composition.

6. The heat sealable film of claim 1, wherein the film comprises copolymer of vinyl chloride and vinyl acetate in an amount ranging from about 5% to about 20% by weight of the resin composition.

7. The heat sealable film of claim 1, wherein the film comprises copolymer of vinyl chloride and vinyl acetate in an amount ranging from about 10% to about 20% by weight of the resin composition.

8. The heat sealable film of claim 1, wherein the film comprises copolymer of vinyl chloride and vinyl acetate in an amount ranging from about 15% to about 20% by weight of the resin composition.

9. The heat sealable film of claim 1, wherein the film is oriented biaxially in an amount ranging from about 50% to about 400% of its original length in the machine direction and in the transverse direction.

10. The heat sealable film of claim 1, wherein the film has a heat sealing window of at least 20° F.

11. The heat sealable film of claim 1, wherein the film has a heat sealing window of at least 30° F.

12. The heat sealable film of claim 1, wherein the film is an irradiated film having crosslinked polymers.

13. The heat sealable film of claim 1, wherein the film has an oxygen transmission rate of about 150 to about 1200 g/100 in$^2$/24 hours.

14. The heat sealable film of claim 1, wherein the film comprises slip in an amount ranging from about 0.05% to about 0.6% by weight of the resin composition.

15. The heat sealable film of claim 1, wherein the film comprises slip in an amount ranging from about 0.01% to about 0.6% by weight of the resin composition.

16. A heat sealable film for use in food packaging comprising a film formed from a resin composition comprising: a blend of polyvinyl chloride; copolymer of vinyl chloride and vinyl acetate; and plasticizer in an amount greater than about 15% by weight of the resin composition; wherein the film is adapted to heat seal to itself; and wherein the film is oriented and heat shrinks in an amount less than 60% of its original length at about 195° F.

* * * * *